US011318515B1

(12) United States Patent
Box et al.

(10) Patent No.: US 11,318,515 B1
(45) Date of Patent: May 3, 2022

(54) LARGE DIAMETER PIPE ROUNDING TOOL AND METHOD OF USE

(71) Applicant: SIGMA CORPORATION, Cream Ridge, NJ (US)

(72) Inventors: Stuart J. Box, Cropwell, AL (US); Satheesh Manicka Seshaiyer Chandrasekaran, Plainsboro, NJ (US)

(73) Assignee: Sigma Corporation, Cream Ridge, NJ (US)

( * ) Notice: Subject to any disclaimer, the term of this patent is extended or adjusted under 35 U.S.C. 154(b) by 0 days.

(21) Appl. No.: 17/170,037

(22) Filed: Feb. 8, 2021

(51) Int. Cl.
*B21D 3/14* (2006.01)
*B23P 6/00* (2006.01)
(Continued)

(52) U.S. Cl.
CPC ............... *B21D 3/00* (2013.01); *B21D 3/14* (2013.01); *B23P 6/00* (2013.01); *F16L 55/18* (2013.01);
(Continued)

(58) Field of Classification Search
CPC . F16L 21/04; F16L 25/08; F16L 25/14; F16L 55/18; B21D 3/14; B23P 6/00; Y10T 29/49893
See application file for complete search history.

(56) References Cited

U.S. PATENT DOCUMENTS 1,600,561 A * 9/1926 Daniel ................. F16L 15/008
285/348
3,748,426 A 7/1973 Stanley
(Continued)

FOREIGN PATENT DOCUMENTS

CN 201338299 Y 11/2009
CN 203021162 U 6/2013
(Continued)

OTHER PUBLICATIONS

English abstract of CN106217249A.
(Continued)

*Primary Examiner* — Jermie E Cozart
(74) *Attorney, Agent, or Firm* — Caesar Rivise, PC

(57) ABSTRACT

An apparatus and method for re-rounding a distorted end (e.g., oval-shaped) of a pipe for insertion into a mechanical joint fitting or pipe bell have a circular diameter. The apparatus involves two separate semi-circular members having jack bolt assemblies evenly distributed in each. The two ends of each of the semi-circular members have extensions that can be releasably coupled to join to the two members to form a circular re-rounding tool. A first semi-circular member is positioned on the maximum diameter side of the distorted pipe and the other semi-circular member is placed on the opposite side of the distorted pipe and extensions joined. With an equal number of jack bolt assemblies in each member, corresponding jack bolt assemblies in the two members are diametrically aligned forming pairs. To re-round the distorted end, pairs of these jack bolt assemblies are tightened in a "star sequence" to re-round the distorted end. The re-rounded end is inserted into the mechanical joint fitting or pipe bell and the extensions are decoupled to easily remove the circular tool from the re-rounded end.

26 Claims, 9 Drawing Sheets

(51) Int. Cl.
  *B21D 3/00*   (2006.01)
  *F16L 55/18*  (2006.01)
  *F16L 25/08*      (2006.01)
  *F16L 25/14*      (2006.01)
  *F16L 21/04*      (2006.01)

(52) U.S. Cl.
  CPC .............. *F16L 21/04* (2013.01); *F16L 25/08* (2013.01); *F16L 25/14* (2013.01); *Y10T 29/49893* (2015.01)

(56) References Cited

U.S. PATENT DOCUMENTS

| | | | |
|---|---|---|---|
| 4,512,178 | A | 4/1985 | Blevins et al. |
| 6,360,578 | B1 | 3/2002 | Bresnahan |
| 6,840,433 | B2 | 1/2005 | Vermaat |
| 6,959,479 | B2 | 11/2005 | Yamanaka et al. |
| 7,185,924 | B1 * | 3/2007 | Longacre ............ F16L 25/065 285/337 |
| 7,647,947 | B1 * | 1/2010 | Littlebrant ................ F16L 7/00 138/159 |
| 7,780,065 | B2 | 8/2010 | Vermaat |
| 8,313,016 | B2 | 11/2012 | Dagenais |
| 8,695,198 | B2 | 4/2014 | Dagenais |
| 9,452,497 | B2 | 9/2016 | Lavalley et al. |
| 10,036,497 | B2 | 7/2018 | Box |
| 10,344,892 | B2 | 7/2019 | Lavalley et al. |
| 10,844,977 | B2 | 11/2020 | Lavalley et al. |
| 2015/0174706 | A1 * | 6/2015 | McClure ............ B23K 37/0533 269/45 |
| 2017/0356577 | A1 * | 12/2017 | Lassen ................ F16L 23/032 |
| 2018/0079037 | A1 * | 3/2018 | Applegate .......... B23K 37/0533 |

FOREIGN PATENT DOCUMENTS

| | | |
|---|---|---|
| CN | 203235797 U | 10/2013 |
| CN | 106217249 A | 12/2016 |
| CN | 107398487 A | 11/2017 |
| CN | 207533720 U | 6/2018 |
| CN | 207533827 U | 6/2018 |
| CN | 109433861 A | 3/2019 |
| CN | 109500151 B | 3/2019 |
| CN | 209272177 U | 8/2019 |
| CN | 110216411 A | 9/2019 |
| CN | 107030942 B | 4/2020 |
| DE | 2934813 C2 | 8/1983 |
| DE | 211724 A1 | 7/1984 |
| DE | 4206439 A1 | 9/1993 |
| EP | 0574645 B1 | 1/1996 |
| FR | 2462213 A1 | 2/1981 |
| FR | 2691387 B1 | 5/1996 |
| KR | 101734466 B1 | 5/2017 |
| SU | 621427 A1 | 8/1978 |

OTHER PUBLICATIONS

English abstract of CN107030942B.
English abstract of CN109433861A.
English abstract of CN109500151B.
English abstract of CN110216411A.
English abstract of CN201338299Y.
English abstract of CN203021162U.
English abstract of CN203235797U.
English abstract of CN207533720U.
English abstract of CN207533827U.
English abstract of CN209272177U.
English abstract of DE2934813C2.
English abstract of DE4206439A1.
English Abstract of FR2462213A1.
English Abstract of FR2691387B1.
English abstract of KR101734466B1.
"How to Use McWane Ductile's Field Rounding Kit", Nov. 26, 2018, retrieved on May 11, 2021 from https://www.youtube.com/watch?v=UNCZ0AnHEC8.

* cited by examiner

LARGE DIAMETER PIPE ROUNDING TOOL AND METHOD OF USE

BACKGROUND OF THE INVENTION

The present invention relates generally to pipe connection and more particularly, to an apparatus and method for rounding distorted pipes into a circular diameter using a two-part tool.

In the pipeline industry, there are often situations where the outer diameter of a pipe needs to be reshaped to ensure complementary engagement with a fitting, a coupling, or other pipe element. Pipe rounding tools are available for reshaping or correcting an "out-of-roundness" pipe end so that the deformed pipe end can be made to fit within a receiving or receptor pipe. However, many of these tools used to correct such an "out-of-roundness" pipe diameters involve large complex machinery such as those shown in U.S. Pat. No. 6,840,433 (Vermaat); U.S. Pat. No. 7,780,065 (Vermaat); U.S. Pat. No. 8,313,016 (Dagenais); U.S. Pat. No. 8,695,198 (Dagenais); U.S. Pat. No. 10,344,892 (Lavalley, et al.); and 10,844,977 (Lavalley, et al.).

Another solution is provided by McWane Ductile's CLOW jacking kit and involves the use of a jack device and chain connected thereto and wrapped around the distorted pipe end. The jack device is placed on the pipe end and is then activated to cause the chain to tighten around the pipe end and restore the pipe end to a circular configuration. The pipe can then be inserted into a receptor pipe and then the jacking kit deactivated and removed.

A further pipe-rounding device is that disclosed in U.S. Pat. No. 10,036,497 (Box) which is owned by the same Assignee, namely, Sigma Corporation, as the present invention and which is incorporated by reference in its entirety herein. In particular, the device comprises a joint restraint device including a continuous ring with a plurality of pipe securing bolts around the circumference of the ring as well as a set of jacking bolt assemblies on an upper region of the ring and a set of jacking bolts on an opposite lower region of the ring. The ring is applied over a deformed pipe end and the pipe securing bolts are then tightened to secure the device to the pipe end. Then the jacking bolts are tightened in a particular sequence to restore the pipe end to a circular cross-section. However, the device is now permanently fixed on the pipe.

While the devices disclosed in the aforementioned publications may be generally suitable for their intended purposes, these devices do not allow for easy method of applying a pipe rounding tool to a deformed pipe end, activating the device to round the deformed pipe end, connect the corrected pipe to a receptor pipe and then to easily remove the pipe rounding tool. Thus, there remains a need for a pipe rounding tool that can be easily transported to and from a location, easily manipulated in the field, attached to a deformed pipe end, activated to restore the circular cross-section of that pipe end, then quickly and easily removed from the pipe once the pipe is inserted into a mechanical joint (MJ) fitting or pipe bell.

All references cited herein are incorporated herein by reference in their entireties.

BRIEF SUMMARY OF THE INVENTION

A tool for re-rounding a distorted end of a pipe to permit its insertion within a mechanical joint (MJ) fitting or pipe bell having a circular diameter is disclosed. The tool comprises: a first semi-circular member having first and second ends with an extension on each end and defining a first extension and a second extension, wherein the first semi-circular member has a first plurality of jack bolt assemblies thereon between the first and second extensions; a second semi-circular member having first and second ends with an extension on each end, defining a third extension and a fourth extension, wherein the second semi-circular member has a second plurality of jack bolt assemblies thereon between the third and fourth extensions; the first and second semi-circular members are releasably coupled together at the first and third extensions and at the second and fourth extensions when the first and second semi-circular members are positioned on opposite sides of the distorted end of the pipe; and wherein each of the jack bolt assemblies includes a corresponding jack bolt that applies a respective mechanical load against the distorted end of the pipe when each jack bolt is tightened through a corresponding channel in a respective semi-circular member, the tightening of the first and second plurality of jack bolts re-rounding the distorted end of the pipe to form a circular outer diameter that fits within the MJ fitting or pipe bell having the circular diameter.

A method for re-rounding a distorted spigot of a pipe to permit its insertion within a mechanical joint (MJ) fitting or pipe bell having a circular diameter is disclosed. The distorted spigot is oval-shaped having a maximum diameter in a first direction and a minimum diameter in a second direction, transverse to the first direction. The method comprises: (a) positioning a first semi-circular member on the distorted spigot on the maximum diameter portion of the distorted spigot, wherein the first semi-circular member has first and second ends with an extension on each end and defines a first extension and a second extension, wherein the first semi-circular member has a first plurality of jack bolt assemblies thereon between the first and second extensions, each one of the first plurality of jack bolt assemblies having a corresponding jack bolt that is threadedly engaged within a channel in the corresponding assembly; (b) positioning a second semi-circular member on a side of the distorted spigot, opposite the position of the first semi-circular member on the distorted spigot, wherein the second semi-circular member has first and second ends with an extension on each end, defining a third extension and a fourth extension, wherein the second semi-circular member has a second plurality of jack bolt assemblies thereon between the third and fourth extensions, wherein the first plurality of jack bolt assemblies and the second jack bolt assemblies are equal in number; (c) releasably coupling the first and third extensions together and the second and fourth extensions together to form a circular tool around the distorted spigot such that a corresponding one of the first plurality of jack bolt assemblies is aligned along a diameter of the circular tool with a corresponding one of the second plurality jack bolt assemblies; and (d) tightening one of the jack bolts in the first plurality of jack bolt assemblies against the distorted spigot followed by tightening one of the jack bolts in the second plurality of jack bolt assemblies, that is aligned along a first diameter of the circular tool with the tightened one of said jack bolts in the first plurality of jack bolts, against the distorted spigot; and (e) repeating step (d) until all jack bolts in the first plurality and the second plurality of jack bolts are tightened such that the distorted spigot is transformed to have a circular outer diameter that fits within the MJ fitting or pipe bell having the circular diameter.

BRIEF DESCRIPTION OF SEVERAL VIEWS OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE PREFERRED EMBODIMENTS

Figure 1:
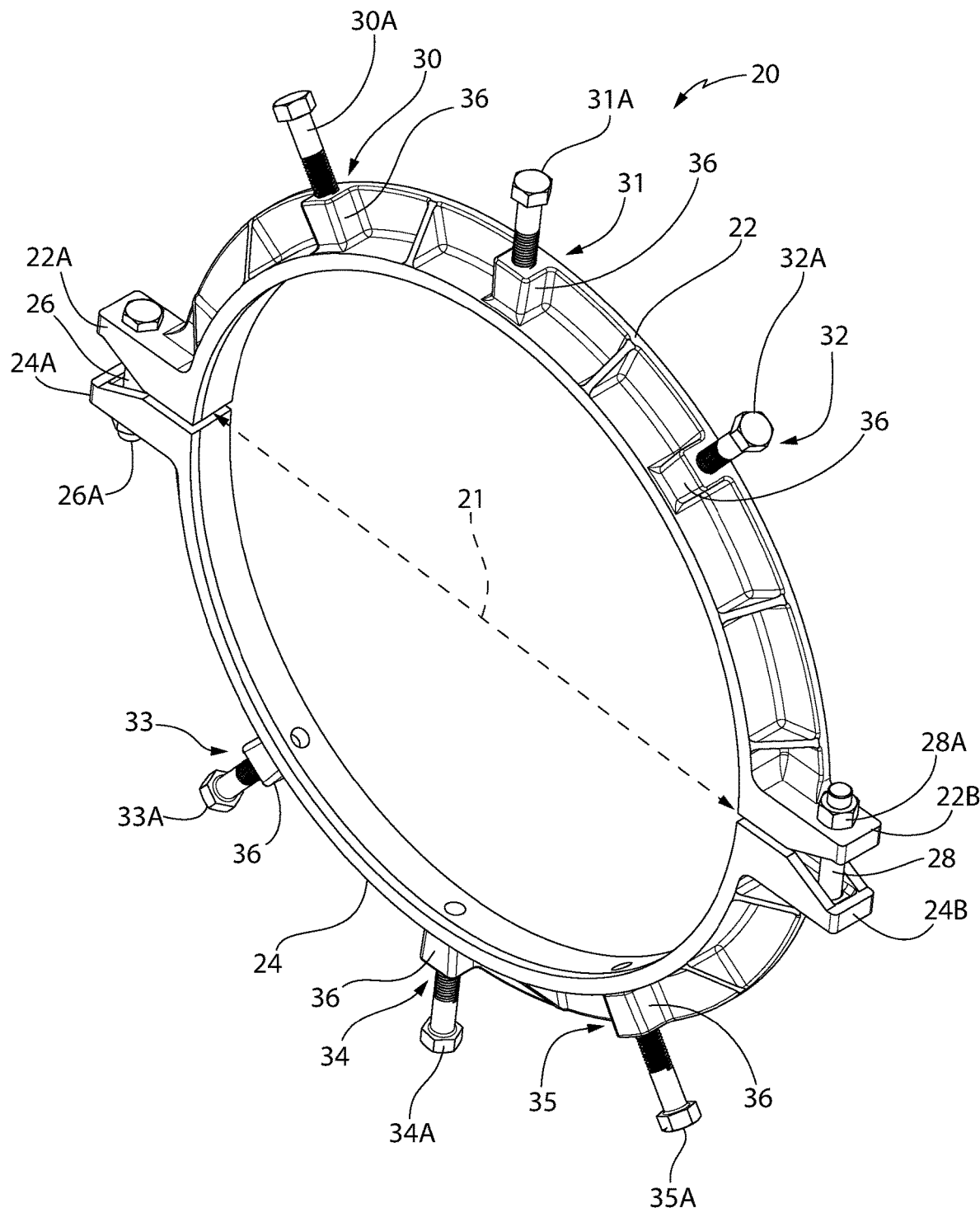
FIG. 1 is an isometric view of the two-part pipe rounding tool of the present invention.

Referring now to the figures, wherein like reference numerals represent like parts throughout the several views, exemplary embodiments of the present disclosure will be described in detail. Throughout this description, various components may be identified having specific values, these values are provided as exemplary embodiments and should not be limiting of various concepts of the present invention as many comparable sizes and/or values may be implemented.

FIG. 1 depicts the pipe rounding tool (PRT) 20 of the present invention. The PRT 20 comprises a semi-circular first half 22 and a semi-circular second half 24 that are releasably secured together at their respective ends 22A/24B and 22B/24B by a respective clamping bolt 26 and 28; respective nuts 26A and 28A are tightened to releasably secure the PRT 20 to the distorted end of a pipe requiring "re-rounding," as will be discussed below. All half tool ends 22A/22B and 24A/24B comprise extensions 23 (see FIG. 2) and include apertures to allow the clamping bolts 26 and 28 to pass therethrough. It should be noted that apertures 25 (FIG. 2) on half tool end 22A and 27 (FIG. 7) on half tool end 24B are countersunk with a hex-shape for seating the hex head of the clamping bolts 26 and 28.

Figure 6:
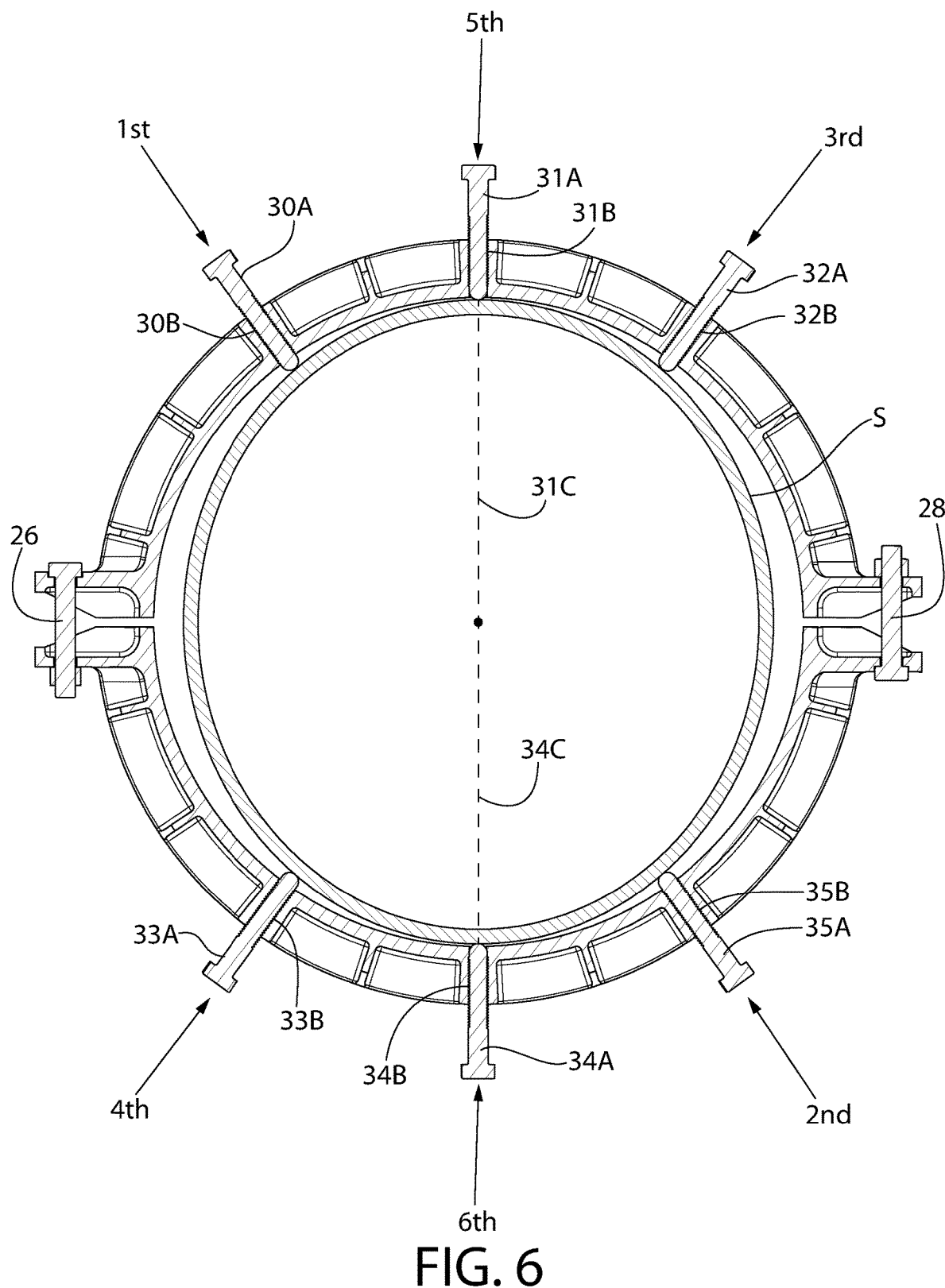
FIG. 6 is a cross-sectional view of the distorted end of the pipe with the pipe rounding tool engaged thereon taken along line 6-6 of FIG. 5 and depicting the alternating or star-pattern sequence of tightening the jack bolt assemblies of the tool to "re-round" the distorted end of the pipe.
Figure 7:
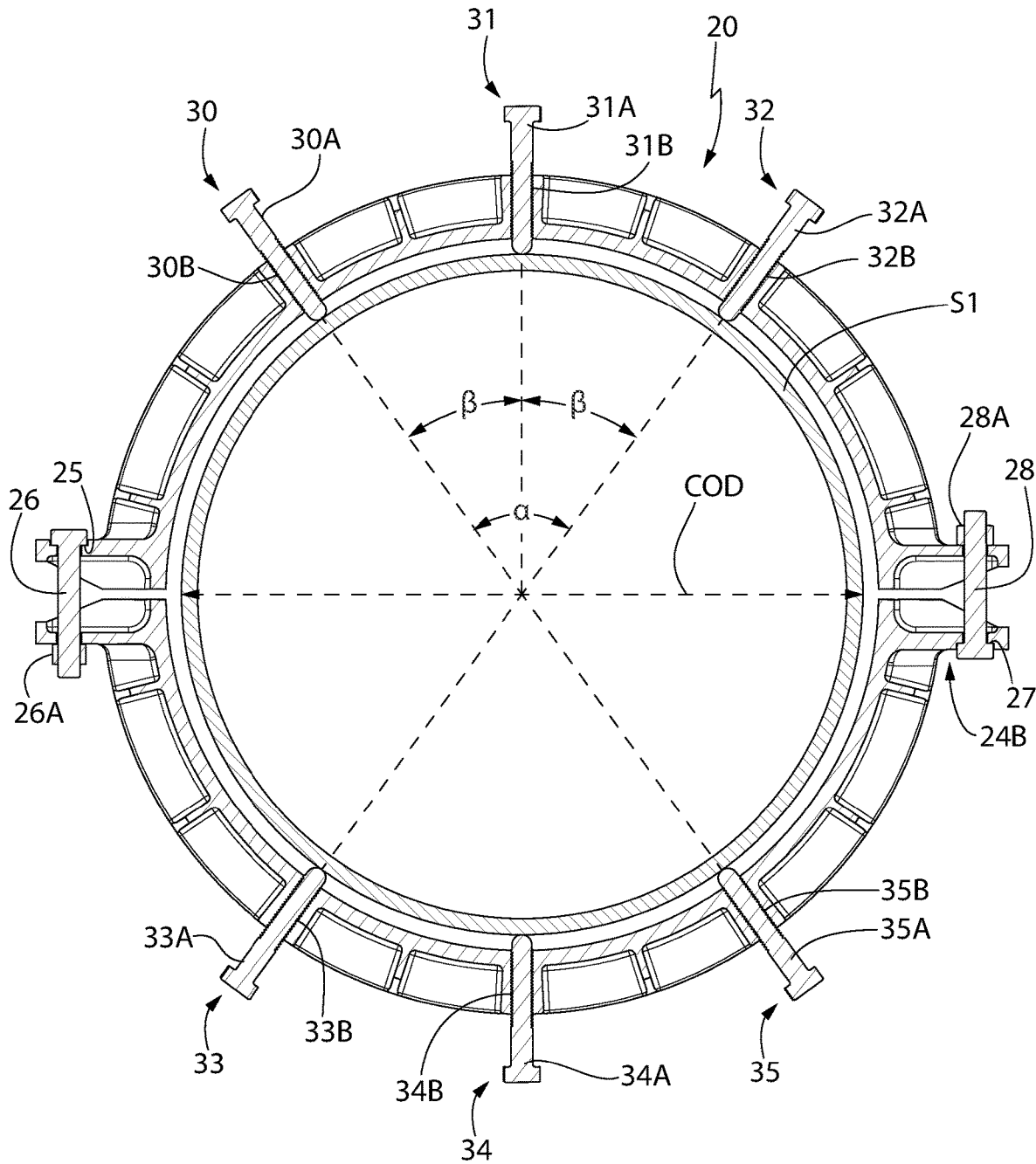
FIG. 7 is a similar view of FIG. 6 but showing how the distorted end of the pipe has been "re-rounded;"

Each tool half 22/24 comprises three jacking bolt assemblies 30/31/32 for the first tool half 22 and three jacking bolt assemblies 33/34/35 for the second tool half 24. Each jacking assembly comprises a housing 36 with internal threaded channels (30B, 31B, 32B, 33B, 34B and 35B as shown in FIGS. 6-7) for engaging with threads on a corresponding jack bolt 30A, 31A, 32A, 33A, 34A, and 35A. As shown most clearly in FIG. 7, outer jack bolt assemblies 30/32 and 33/35 form an included angle α of 72° while the center jack bolt assemblies 31/34 bisects that included angle, forming bi-sected angle β of 36°. Thus the outer jack bolt assemblies 30/32 and 33/35 are equally spaced away from their respective center jack bolt assemblies 31/34.

Figure 2:
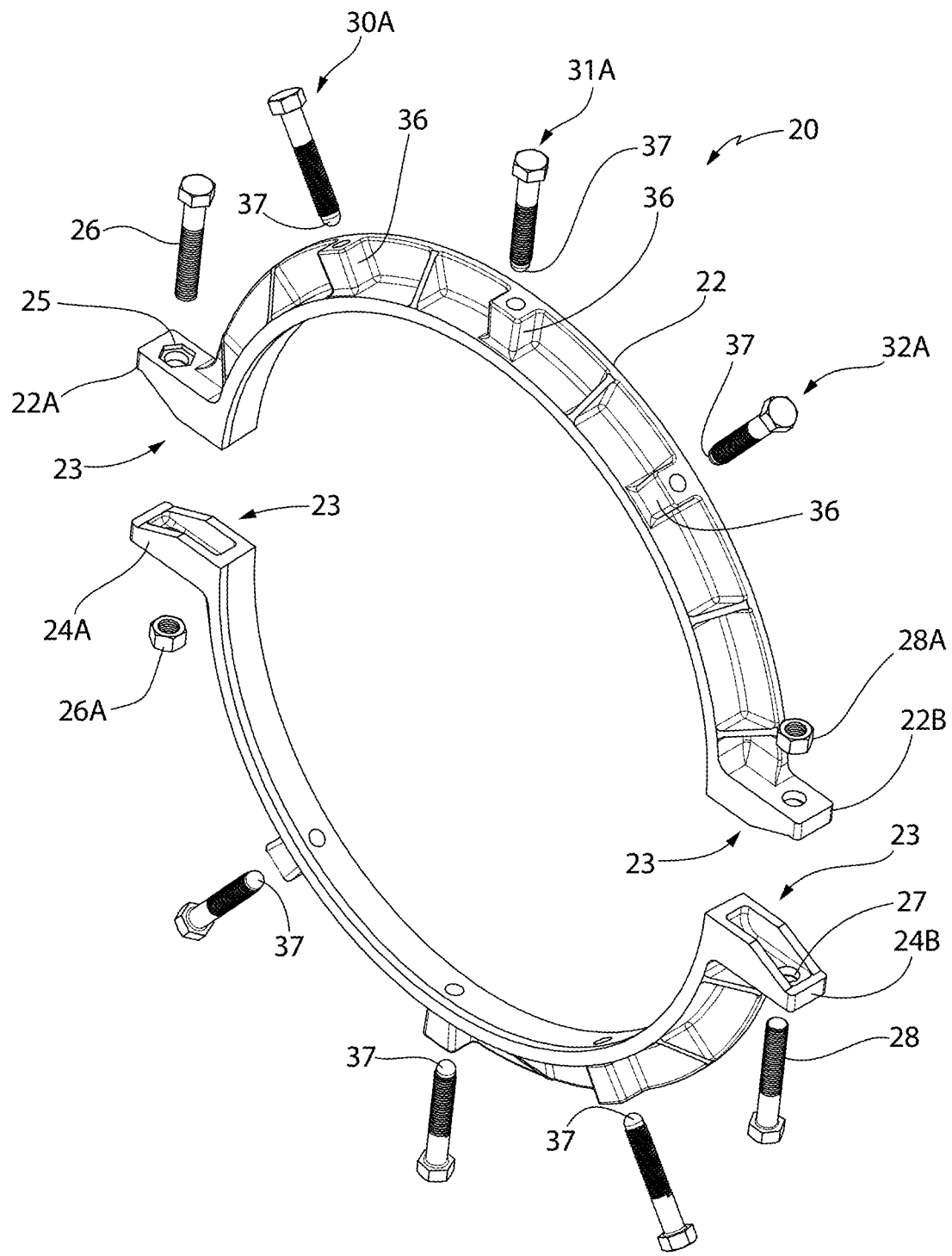
FIG. 2 is an exploded isometric view of the two-part pipe rounding tool of FIG. 1.

FIG. 2 provides an exploded view of the PRT 20 to depict all of it component parts. The PRT 20 may comprise a ductile iron construction and comes in different sizes for different sizes of pipes. The term "large diameter" for the PRT 20 identifies that the PRT 20 is meant for industrial size pipes as opposed to small plumbing pipes used in commercial buildings and residential homes. By way of example only, one embodiment of the PRT 20 can used for re-rounding the distorted end of 30-inch diameter pipes, another embodiment is configured for re-rounding the distorted end of 36-inch diameter pipes, a further embodiment is configured for re-rounding the distorted end of 42-inch diameter pipes while another embodiment of the PRT 20 can be used for re-rounding the distorted end of 48-inch diameter pipes. The inner diameter 21 (FIG. 1) of each half tool 22/24 defines the size of the PRT 20. Thus, the PRT 20 is versatile and can be used to re-round the distorted end of ductile iron pipes as well as PVC (polyvinyl chloride) pipes.

Each jacking bolt 30A, 31A, 32A, 33A, 34A, and 35A comprises a rounded end 37 (FIG. 2) for engaging a distorted end S of a pipe 1 to re-round the end S without piercing or otherwise cutting into the surface of the pipe 1 when they are "activated", tightened against the distorted end S. For the PRT 20 embodiment used for re-rounding the distorted end of 30-inch or 36-inch pipes or 42-inch pipes, by way of example only, the jacking bolts 30A, 31A, 32A, 33A, 34A, and 35A may comprise a 1"×3.5" size, with a hex head. For the PRT 20 embodiment used for re-rounding the distorted end of 48-inch pipes, also by way of example only, the jacking bolts 30A, 31A, 32A, 33A, 34A, and 35A may comprise a 1¼"×6" size, with a hex head. The clamping bolts 26/28 for the PRT 20 embodiments used for re-rounding the distorted end of 30-inch, 36-inch and 42-inch pipes may comprise 1"×6" bolts, by way of example only. The clamping bolts 26/28 for the PRT 20 embodiment used for re-rounding the distorted end of 48-inch pipes may comprise 1¼"×6" bolts, also by way of example only.

Figure 3:
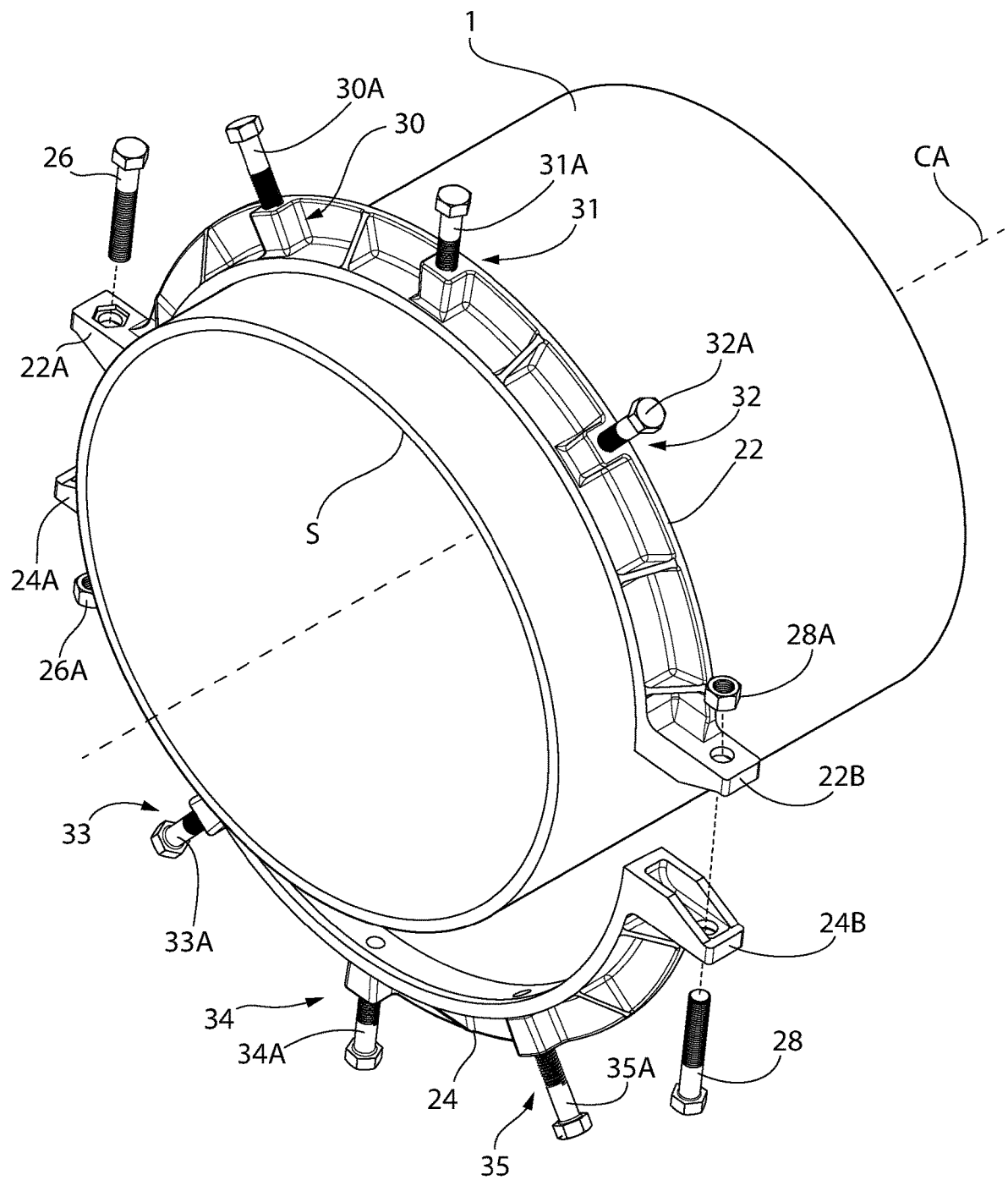
FIG. 3 is an exploded view showing how the two-part pipe rounding tool is releasably secured to the distorted end of the pipe requiring "rounding;"
Figure 4:
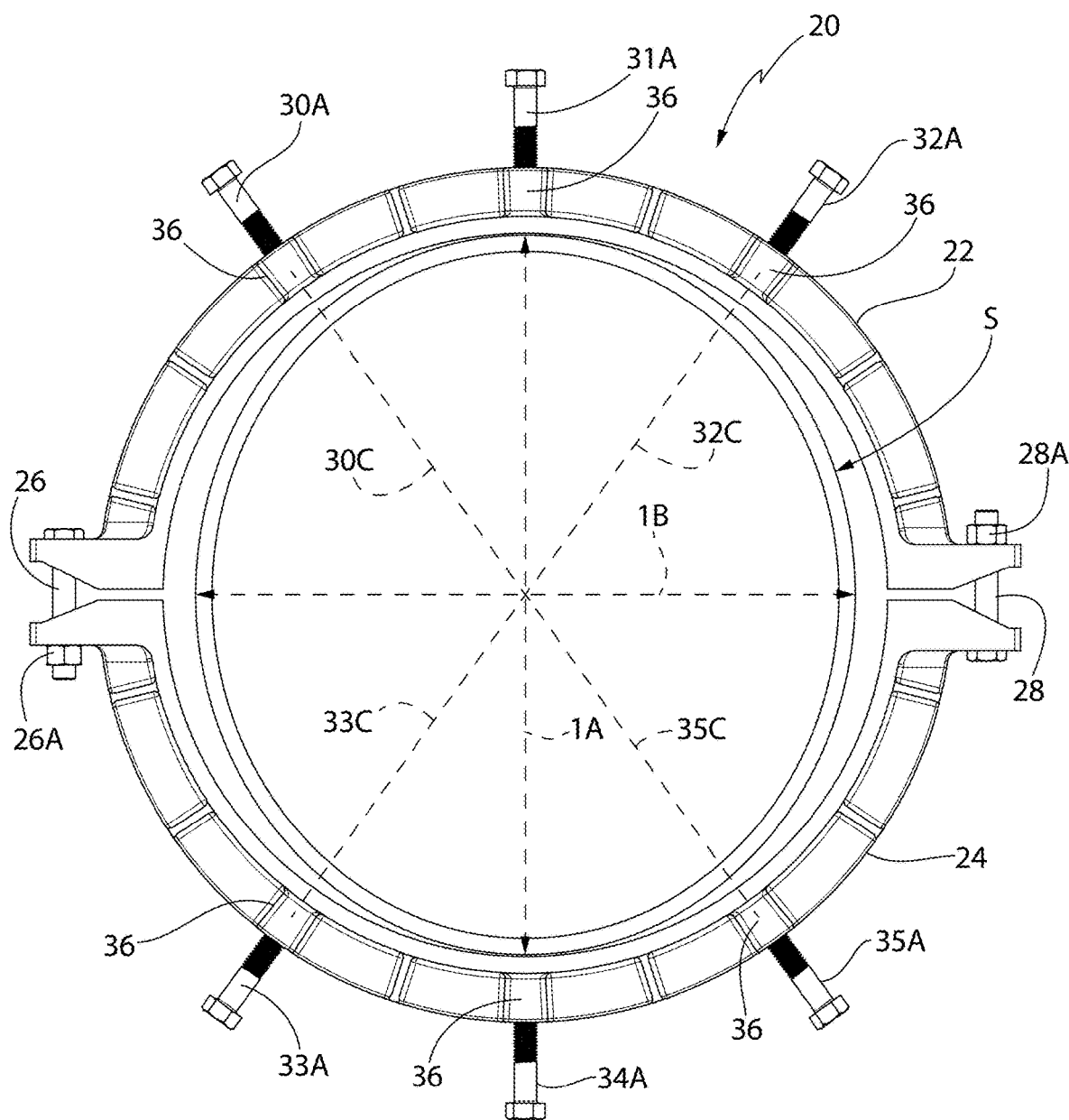
FIG. 4 is front view of the distorted "oval-shaped" end of the pipe which is about to be "rounded" by activation of the two-part pipe rounding tool.
Figure 8:
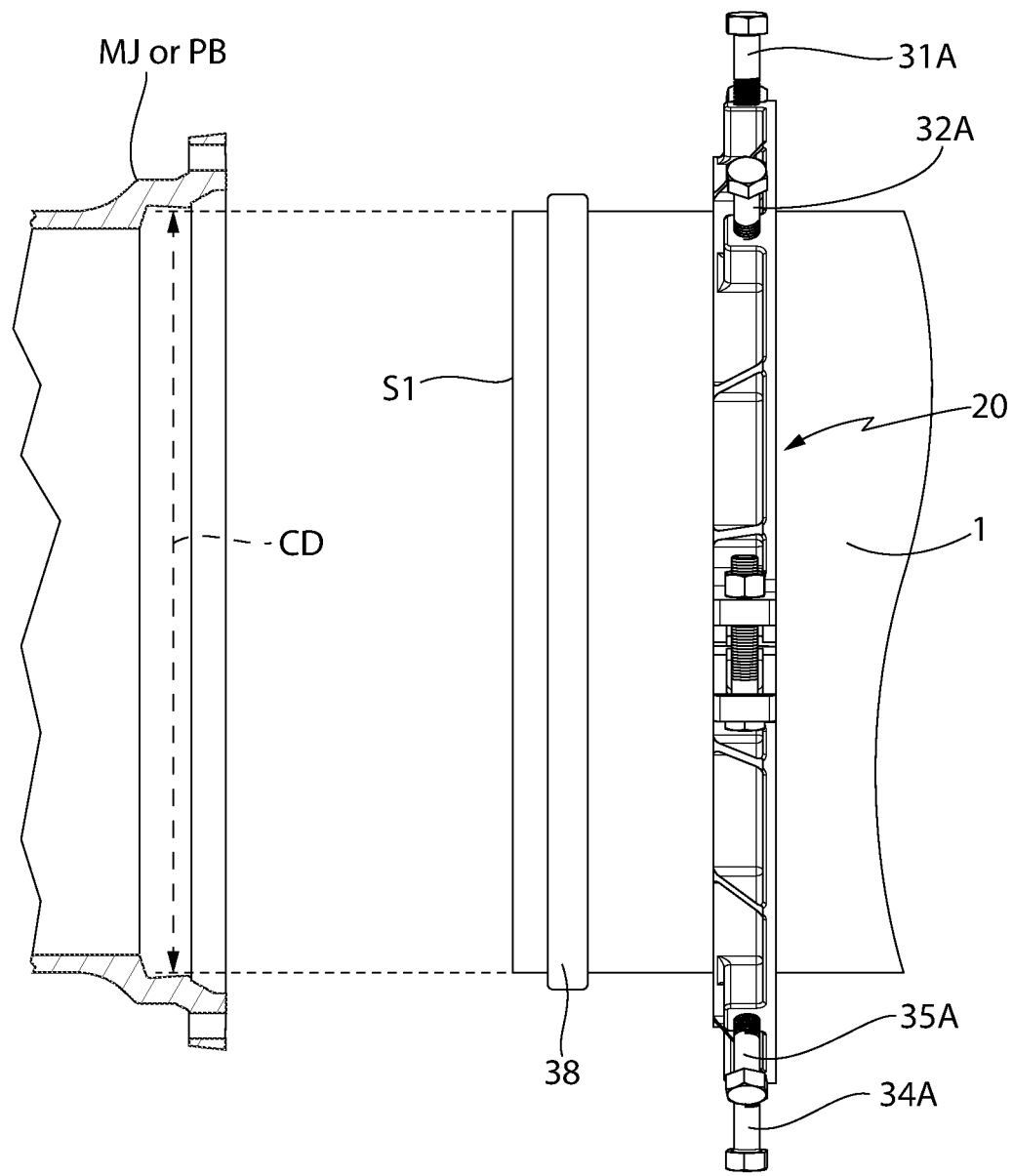
FIG. 8 is a side view of the re-rounded end of the pipe and with a sealing gasket positioned thereon and depicting the re-rounded end of the pipe now being able to slide and seat properly within the MJ fitting or bell pipe.
Figure 9:
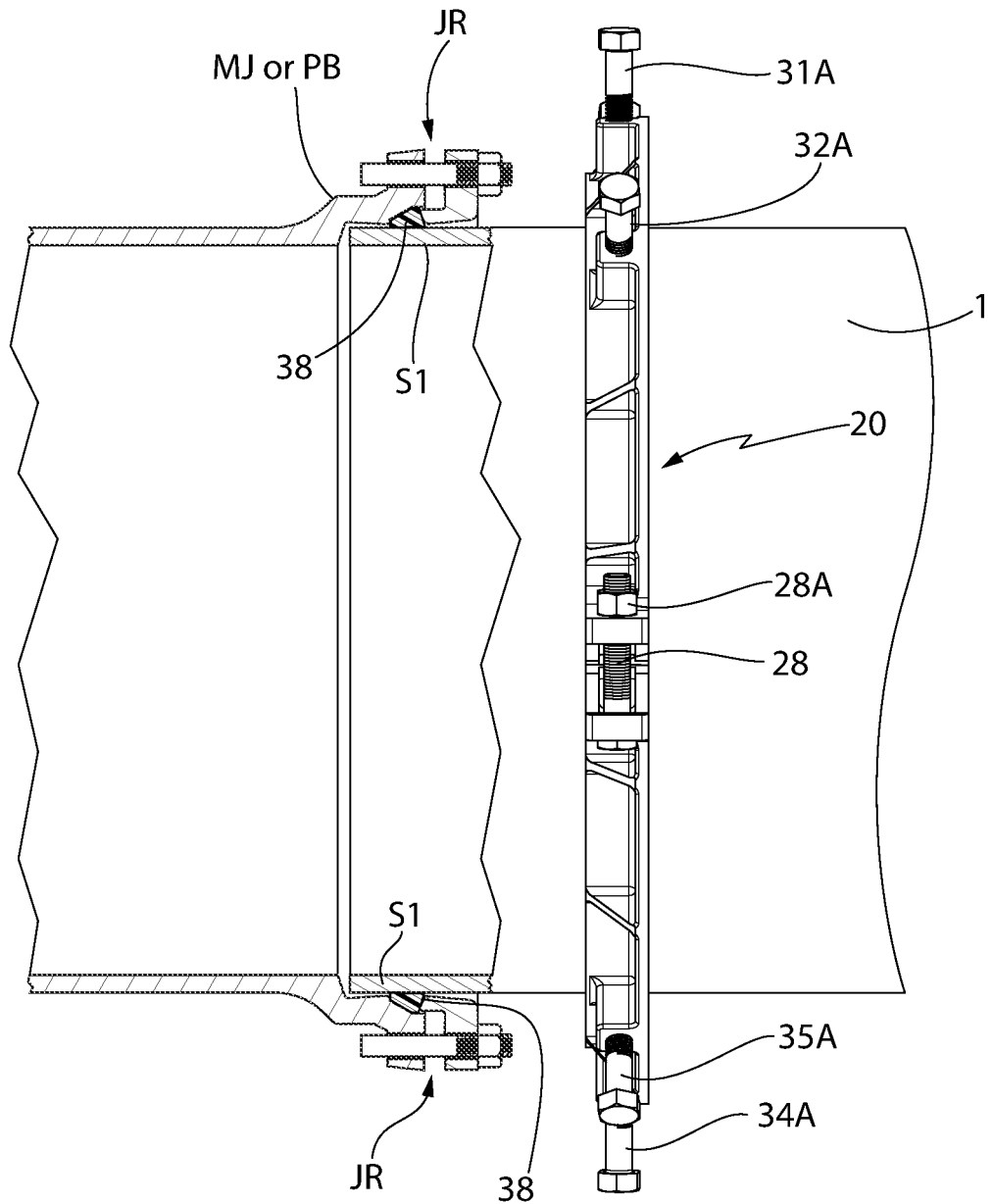
FIG. 9 depicts the re-rounded end of the pipe properly secured inside the MJ fitting or bell pipe.

FIG. 3 depicts one embodiment of the PRT 20 being releasably secured to a pipe 1 having a distorted end S, e.g., it is oval-shaped (see FIG. 4). This end, typically referred to as a "spigot," if undistorted and therefore having a circular diameter, is insertable within a receptor fitting or pipe which has a circular diameter CD just slightly larger than the circular diameter of the undistorted spigot. By way of example only, this receptor fitting or pipe is shown in FIGS. 5 and 8-9 as a mechanical joint (MJ) fitting, or as the end of another pipe, e.g., a pipe bell (PB); as such the MJ fitting and the pipe bell PB shown in FIGS. 5 and 8-9 are meant to represent any receptor fitting or pipe having a circular diameter CD for receiving therein an undistorted spigot of another pipe 1.

Figure 5:
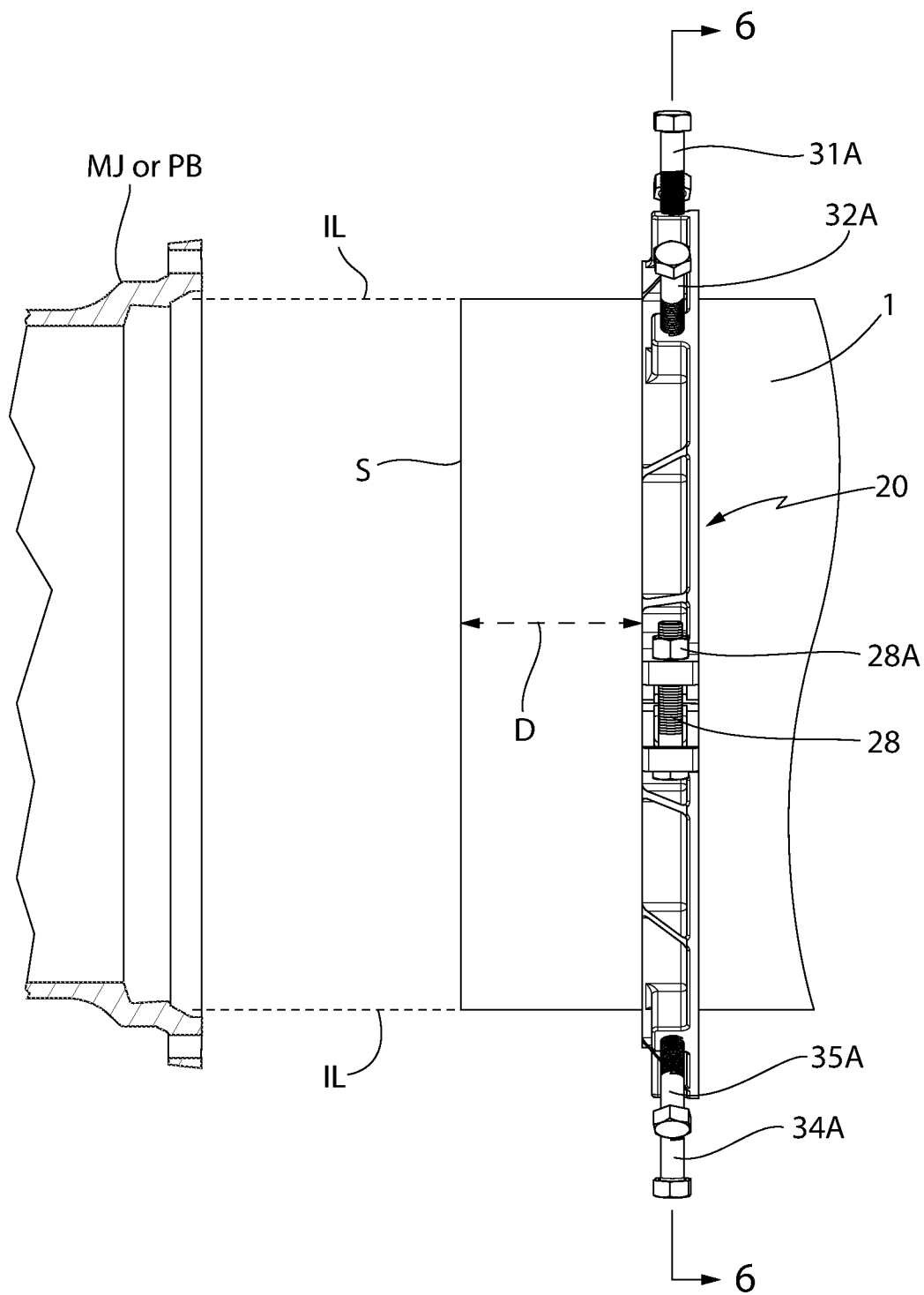
FIG. 5 is a side view of the distorted "oval-shaped" end of the pipe, just prior to activation of the pipe rounding tool, and depicting that the distorted end of the pipe will not be properly seated within a mechanical joint (MJ) fitting or pipe bell due to the distortion.

However, if this spigot is distorted S (e.g., it is oval-shaped), it is unable to be inserted into the MJ fitting or pipe bell PB, as shown in FIG. 5. In particular, as can be seen most clearly in FIG. 4, the distorted spigot S of pipe 1 has maximum diameter 1A that is greater than its minimum diameter 1B, meaning that the spigot S is not circular and will not seat properly within the circular diameter CD of the MJ fitting or pipe bell PB, as indicated by the interference lines IL shown in FIG. 5. As a result, the spigot S needs to be "re-rounded" to form a circular-shaped spigot that can seat properly within the MJ fitting or pipe bell PB.

With the PRT 20 installed on the distorted spigot S (FIG. 4), it should noted that each jack bolt 30A, 31A and 32A, when tightened against the distorted spigot S, applies a mechanical load in a distinct radial direction, namely, 30C, 31C and 32C, respectively; see FIGS. 4 and 6. Conversely, each jack bolt 33A, 34A and 35A, when tightened against the distorted spigot S, applies a mechanical load in a distinct radial direction, namely, 33C, 34C and 35C, respectively; see FIGS. 4 and 6 also. It should be noted from FIG. 4, that particular jack bolt assemblies in the tool halves 22/24 are diametrically aligned, namely, jack bolt assembly 30 is aligned with jack bolt assembly 35, jack bolt assembly 31 is aligned with jack bolt assembly 34 and jack bolt assembly 32 is aligned with jack bolt assembly 36. This is done to provide mechanical loading in opposite radial directions.

To accomplish a "re-rounding" of the distorted spigot S, the following procedure is followed using the PRT 20:

Step 1: Before the PRT 20 is applied to the pipe 1, the "out-of-round" spigot S is measured to determine the maximum diameter 1A and the minimum diameter 1B and these are marked on the distorted spigot S.

Step 2: One tool half 22 or 24 is positioned on the pipe 1 on the maximum diameter 1A side of the pipe 1 and the other tool half 22 or 24 is positioned on the opposite side of the pipe 1; and both of these tool halves 22/24 are positioned at a distance D (e.g., 1 inch away from a pipe insertion mark), see FIG. 5, from the end of the distorted spigot S.

Step 3: With the tool halves 22/24 positioned on the pipe 1, the clamping bolts 26/28 are installed and the corresponding nuts 26A/28A are tightened (e.g., 130 ft-lbs), thereby releasably securing the PRT 20 to the pipe 1 at the distorted spigot S.

Step 4: The distorted spigot S is now ready to be "re-rounded" (also referred to as being made circular). This is accomplished by using an alternating or star-pattern sequence, as shown in FIG. 6: jack bolt 30A is tightened first, jack bolt 35A is tightened second, jack bolt 32A is tightened third, jack bolt 33A is tightened fourth, jack bolt 31A is tightened fifth and then jack bolt 34A is tightened last. This "activation" by the tightening of the jack bolt assemblies 30-35 against the distorted spigot S re-rounds the spigot S of pipe 1 into re-rounded spigot 51, as shown in FIG. 7. Activation of these jack bolts 30A, 31A, 32A, 33A, 34A and 35A in this sequence involves selective radial movement relative to a central axis CA (FIG. 3) of the pipe 1 to apply a mechanical load to an outer surface of the distorted spigot S. This activation deforms the spigot S proximate the maximum outer diameter 1A of the spigot S to selectively urge an outer surface of the spigot S to a desired substantially constant outer diameter COD (FIG. 7) that will seat properly within the circular diameter CD of the MJ fitting or pipe bell PB. As such, the maximum diameter 1A and minimum diameter 1B shown in FIG. 4 have now been transformed into the constant outer diameter COD shown in FIG. 7.

Step 5: The diameter COD of the re-rounded spigot Si is measured again to ensure that the spigot Si is round and will seat properly within the MJ fitting diameter CD or the pipe bell PB diameter CD.

Step 6: An O-ring or gasket 38 (FIG. 8) may be slipped over the re-rounded spigot Si (also referred to as the "transformed spigot") and the spigot Si is then inserted into the MJ fitting or pipe bell PB, compressing the O-ring/gasket to make a tight seal, as shown most clearly in FIG. 9. A joint restraint JR (FIG. 9) may also be engaged at the connection interface to further secure the spigot Si within the MJ fitting or pipe bell PB.

Step 7: The jack bolts 30A-35A are untightened in no particular order this time.

Step 8: The clamping bolts 26/28 are disengaged by untightening the respective nuts 26A/28A and the two tool halves 22/24 are removed from the pipe 1 and the PRT 20 is now ready for use on a distorted spigot S of another pipe 1.

Thus, in view of the foregoing, the present invention provides a pipe rounding tool that can be easily transported to and from a location, easily manipulated in the field, attached to a deformed pipe end, activated to restore the circular cross-section of that pipe end, and then quickly and easily removed from the pipe once the re-rounded pipe is inserted into a MJ fitting or pipe bell PB. Moreover, a variety of sizes of this pipe rounding tool is available for servicing a wide variety of pipe sizes.

While the invention has been described in detail and with reference to specific examples thereof, it will be apparent to one skilled in the art that various changes and modifications can be made therein without departing from the spirit and scope thereof.

What is claimed is:

1. A tool for re-rounding a distorted end of a pipe to permit its insertion within a mechanical joint (MJ) fitting or pipe bell having a circular diameter, said tool comprising:
   a first semi-circular member having first and second ends with an extension on each end and defining a first extension and a second extension, said first semi-circular member having a first plurality of jack bolt assemblies thereon between said first and second extensions;
   a second semi-circular member having first and second ends with an extension on each end, defining a third extension and a fourth extension, said second semi-circular member having a second plurality of jack bolt assemblies thereon between said third and fourth extensions;
   said first and second semi-circular members being releasably coupled together at said first and third extensions and at said second and fourth extensions when said first and second semi-circular members are positioned on opposite sides of the distorted end of the pipe; and
   wherein each of said jack bolt assemblies includes a corresponding jack bolt that applies a respective mechanical load against the distorted end of the pipe when each jack bolt is tightened through a corresponding channel in a respective semi-circular member, the tightening of said first and second plurality of jack bolts re-rounding the distorted end of the pipe to form a circular outer diameter that fits within the MJ fitting or pipe bell having the circular diameter, and wherein each jack bolt of said first and second plurality of jack bolt assemblies comprises a rounded end for engaging the distorted end of the pipe.

2. The tool of claim 1 wherein each one of said first plurality of jack bolt assemblies are provided on said first semi-circular member to provide mechanical loads in distinct radial directions when said first and second semi-circular members are releasably coupled together around the pipe and each one of said corresponding jack bolts of said first plurality of jack bolt assemblies are tightened against the distorted end of the pipe.

3. The tool of claim 2 wherein each of one said second plurality of jack bolt assemblies are provided on said second semi-circular member and are aligned with a corresponding one of said jack bolt assemblies on said first semi-circular member, but oppositely-directed in said distinct radial directions, and wherein said corresponding jack bolts of said second plurality of jack bolt assemblies provide mechanical loads along said distinct radial directions, but in opposite directions, when the corresponding jack bolts of said second plurality of jack bolt assemblies are tightened against the distorted end of the pipe.

4. The tool of claim 2 wherein said first plurality of jack bolt assemblies comprises three jack bolt assemblies and said second plurality of jack bolt assemblies comprises three jack bolt assemblies.

5. The tool of claim 4 wherein said three jack bolt assemblies of said first semi-circular member are equally spaced from each other and said three jack bolt assemblies of said second semi-circular member are equally-spaced from each other.

6. The tool of claim 5 wherein said three jack bolt assemblies of said first semi-circular member and of said second semi-circular member form two outer jack bolt assemblies that are spaced 36°, on opposite sides, from a centrally-located jack bolt assembly.

7. The tool of claim 1 wherein said first and second semi-circular members are releasably coupled together at said first and third extensions and at said second and fourth extensions via first fastener that passes through apertures in said first and third extensions and a second fastener that passes through apertures in said second and fourth extensions.

8. The tool of claim 1 wherein said first and second semi-circular members comprise ductile iron.

9. The tool of claim 1 wherein the pipe having a distorted end is ductile iron.

10. The tool of claim 1 wherein the pipe having a distorted end is polyvinyl chloride (PVC).

11. A method for re-rounding a distorted spigot of a pipe to permit its insertion within a mechanical joint (MJ) fitting or pipe bell having a circular diameter, the distorted spigot being oval-shaped having a maximum diameter in a first direction and a minimum diameter in a second direction, transverse to said first direction, said method comprising:

(a) positioning a first semi-circular member on the distorted spigot on the maximum diameter portion of the distorted spigot, said first semi-circular member having first and second ends with an extension on each end and defining a first extension and a second extension, said first semi-circular member having a first plurality of jack bolt assemblies thereon between said first and second extensions, each one of said first plurality of jack bolt assemblies having a corresponding jack bolt that is threadedly engaged within a channel in said a corresponding jack assembly;

(b) positioning a second semi-circular member on a side of the distorted spigot, opposite the position of said first semi-circular member on the distorted spigot, said second semi-circular member having first and second ends with an extension on each end, defining a third extension and a fourth extension, said second semi-circular member having a second plurality of jack bolt assemblies thereon between said third and fourth extensions, said first plurality of jack bolt assemblies and said second jack bolt assemblies being equal in number;

(c) releasably coupling said first and third extensions together and said second and fourth extensions together to form a circular tool around said distorted spigot such that a corresponding one of said first plurality of jack bolt assemblies is aligned along a diameter of said circular tool with a corresponding one of said second plurality jack bolt assemblies; and (d) tightening one of said jack bolts in said first plurality of jack bolt assemblies against the distorted spigot followed by tightening one of said jack bolts in said second plurality of jack bolt assemblies, that is aligned along a first diameter of said circular tool with said tightened one of said jack bolts in said first plurality of jack bolts, against the distorted spigot; and (e) repeating step (d) until all jack bolts in said first plurality and said second plurality of jack bolts are tightened such that the distorted spigot is transformed to have a circular outer diameter that fits within the MJ fitting or pipe bell having the circular diameter.

12. The method of claim 11 further comprising the step of inserting said transformed spigot into the MJ fitting or pipe bell having the circular diameter.

13. The method of claim 12 further comprising the step of untightening all of said jack bolts to disengage them from contact with the transformed spigot.

14. The method of claim 13 further comprising the step of uncoupling said first and third extensions from each other and uncoupling said second and fourth extensions from each other to remove said circular tool from said transformed spigot.

15. The method of claim 12 wherein said step of inserting said transformed spigot into the MJ fitting or pipe bell comprises first installing an O-ring or gasket on the transformed spigot and then inserting said spigot into the MJ fitting or pipe bell to seal the spigot/MJ fitting or spigot/pipe bell connection.

16. The method of claim 12 wherein said step of inserting said transformed spigot into the MJ fitting or pipe bell is preceded by measuring said circular outer diameter of said transformed spigot to verify it will fit within the MJ fitting or pipe bell having the circular diameter.

17. The method of claim 11 wherein said first and second plurality of jack bolt assemblies each comprises three jack bolt assemblies.

18. The method of claim 17 wherein said three jack bolt assemblies of said first jack bolt assemblies are equally spaced from each other and said three jack bolt assemblies of said second semi-circular members are equally spaced from each other.

19. The method of claim 18 wherein said three jack bolt assemblies of said first semi-circular member and of said second semi-circular member form two outer jack bolt assemblies that are spaced 36°, on opposite sides, from a centrally-located jack bolt assembly.

20. The method of claim 11 wherein said step of releasably coupling said first and third extensions together and said second and fourth extensions together comprises inserting a first fastener through apertures in said first and third extensions and inserting a second fastener through apertures in said second and fourth extensions.

21. The method of claim 11 wherein each jack bolt of said first and second plurality of jack bolt assemblies comprises a rounded end for engaging the distorted spigot.

22. The method of claim 11 wherein said first and second semi-circular members comprise ductile iron.

23. The method of claim 11 wherein the distorted spigot is ductile iron.

24. The method of claim 11 wherein the distorted spigot is polyvinyl chloride (PVC).

25. The method of claim 11 wherein said step (a) of positioning a first semi-circular member on the distorted spigot is preceded by measuring the maximum diameter and the minimum diameter of the distorted spigot and marking them on the distorted spigot.

26. The method of claim 11 wherein said step (a) of positioning a first semi-circular member on the distorted spigot comprises positioning said first semi-circular member away from an extreme end of the distorted spigot.

* * * * *